(12) United States Patent
Dreher

(10) Patent No.: US 8,220,606 B2
(45) Date of Patent: Jul. 17, 2012

(54) DUAL CLUTCH TRANSMISSION AND METHOD FOR CONTROLLING IT

(75) Inventor: Alexander Dreher, Sinzheim (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 804 days.

(21) Appl. No.: 12/291,476

(22) Filed: Nov. 10, 2008

(65) Prior Publication Data

US 2009/0186742 A1    Jul. 23, 2009

(30) Foreign Application Priority Data

Nov. 15, 2007   (DE) .......................... 10 2007 054 586

(51) Int. Cl.
*F16H 61/12* (2010.01)
*F16H 61/688* (2006.01)

(52) U.S. Cl. .................. 192/3.56; 192/48.2; 74/330

(58) Field of Classification Search .............. 192/3.56, 192/48.2, 84.6; 74/330; 477/906
See application file for complete search history.

(56) References Cited

U.S. PATENT DOCUMENTS

| | | | | |
|---|---|---|---|---|
| 6,679,362 B2 * | 1/2004 | Berger et al. | ................... | 192/31 |
| 7,384,374 B2 * | 6/2008 | Jiang | ............................. | 477/120 |
| 7,387,590 B2 * | 6/2008 | Dreher | ............................. | 477/77 |
| 2007/0022835 A1 * | 2/2007 | Kilian et al. | ................... | 74/340 |
| 2009/0301835 A1 * | 12/2009 | Tumback | ................... | 192/48.2 |

FOREIGN PATENT DOCUMENTS

| | | |
|---|---|---|
| DE | 10206561 A1 | 10/2002 |
| DE | 102004009832 A1 | 9/2004 |

* cited by examiner

*Primary Examiner* — David D Le
*Assistant Examiner* — Jude Agendia
(74) *Attorney, Agent, or Firm* — Simpson & Simpson, PLLC

(57) ABSTRACT

The invention relates to a dual clutch transmission with two friction clutches and a method for controlling it, where the two friction clutches are actuated utilizing electromechanical disengaging units. To counteract lockup of the dual clutch transmission in the event of a failure of an electric motor, the functional capability of the electric motors is monitored. If the function of an electric motor is deficient, a signal is generated in the control device that brings about in the program sequence of the transmission control system a disengagement of all of the gears that are situated in a sub-drivetrain whose friction clutch is actuated by the affected electric motor. In this way it is possible to prevent lockup of the dual clutch transmission during a malfunction of an electric motor during a state in which torque is being transmitted to the sub-drivetrain.

10 Claims, 2 Drawing Sheets

DUAL CLUTCH TRANSMISSION AND METHOD FOR CONTROLLING IT

This patent application claims priority from German Patent Application No. 10 2007 054 586.1, filed on Nov. 15, 2007 and is hereby incorporated by reference in its entirety.

FIELD OF THE INVENTION

The invention relates to a dual clutch transmission with two sub-drivetrains, each having a friction clutch, and a method for controlling it.

BACKGROUND OF THE INVENTION

Dual clutch transmissions are known and introduced on the market; they are made up of two sub-drivetrains, each having a plurality of shiftable gears, and are operatively connectible to a combustion engine by means of a friction clutch. The two friction clutches can be actuated by means of disengaging systems, which are driven by an electric motor and convert the rotational drive to an axial motion to act on a lever system that effects the actuation of the friction clutch. Such disengaging systems are revealed for example in DE 10 2004 009 831 A1 which is hereby incorporated by reference in its entirety. To prevent the dual clutch transmission from locking up due to an uncontrolled insertion of torque into the dual clutch transmission through both friction clutches in the event of a malfunction of the electric motor, for example a failure or a defective feed line, the disengaging systems are equipped with energy storage devices that move the disengaging system into a position where the friction clutch is disengaged when no current is flowing to the electric motor.

Starting from this situation, the task is to propose a dual clutch system and a method for operating it whose disengaging systems are designed more simply and economically.

BRIEF SUMMARY OF THE INVENTION

The problem is solved by a dual clutch transmission with two sub-drivetrains, each having at least a plurality of shiftable gears and each having a friction clutch operating between a sub-drivetrain and a combustion engine, and with a clutch disengaging system that actuates the two friction clutches, while an electric motor acts on each friction clutch through a disengaging mechanism, and with at least one control device to control the two friction clutches and shift the gears of the two sub-drivetrains, where a routine is provided in the at least one control device to check the functional capability of the electric motors, and if the functional capability of at least one electric motor deviates from predefined values all of the gears of the sub-drivetrain whose assigned friction clutch is operated by the at least one electric motor are disengaged.

The problem is further solved by a method for controlling a dual clutch transmission with two sub-drivetrains, each having at least one shiftable gear and each having a friction clutch operating between a sub-drivetrain and a combustion engine, and with a clutch disengaging system that actuates the two friction clutches, while an electric motor acts on each friction clutch through a disengaging mechanism, and with at least one control device to control the two friction clutches and shift the gears of the two sub-drivetrains, where the functional capability of the electric motors is checked in the at least one control device, and if the functional capability of at least one electric motor deviates from predefined limiting values all of the gears of the sub-drivetrain whose assigned friction clutch is operated by the at least one electric motor are disengaged.

The device and the corresponding method achieve an uncoupling of the sub-drivetrain in question from the transmission output shaft, in that all of the gears of the sub-drivetrain are disengaged. The gears are engaged for example in the usual manner from a neutral position into a shifted position and disengaged again in the reverse manner by means of shifting and selection actuators or a shifting roller, or with rotating transmission elements by means of correspondingly arranged clutches and brakes between the transmission input shaft of a sub-drivetrain and the transmission output shaft, so that no torque is transmitted between transmission input shaft and transmission output shaft; and in the event of a malfunction of the electric motor in question while the friction clutch is partially or completely engaged, it is true that the transmission input shaft of the sub-drivetrain in question is accelerated by means of the other sub-drivetrain during operation of the dual clutch transmission, but the transmission is prevented from locking up. In this way the vehicle can be operated similarly to an automated shift transmission with reduced gear step intervals, for example in an emergency driving mode, and the combustion engine is not required to be shut down when the vehicle is standing still.

The design of the disengaging mechanism is simplified by the fact that disengaging systems that open automatically when the electric motor is not powered can be dispensed with, and therefore a simpler design is possible without keeping restoring forces in reserve to disengage the friction clutches. Consequently, the disengaging systems do not need to be self-opening, and can be self-holding. In special cases, instead of the preferably used friction clutches that are engaged under pressure, it is possible to use at least one friction clutch that is pressed open or that is pressed closed by force.

The controlling of the clutch disengaging system and of the actuators for operating the dual clutch transmission may take place in a single control device, with the appropriate control values being calculated and issued to the individual actuators in a common program sequence with individual routines or in separate program sequences. Alternatively, separate control devices that have signal connections with each other may be provided for the transmission and the friction clutches. The transmission control device or devices may have signal connections with other control devices, for example to a control unit for controlling the combustion engine, for example in order to control the combustion engine appropriately depending on clutch or transmission parameters, in particular in the event of malfunctioning of an electric motor of the clutch disengaging system, for example by limiting the maximum torque to be delivered or the speed of rotation. The signals are transmitted here in an advantageous manner using a data bus such as a CAN bus. In particular, the control device for controlling the clutch disengaging system can be safeguarded redundantly against a power failure, for example if the supply connector becomes detached from the control unit or if there is a break in the supply line. In special cases a dedicated power supply may be provided—for example an accumulator, a battery or a charged condenser—which can compensate for a power failure at least for a short time.

The functional capability of the electric motors of the clutch disengaging system can be assessed on the basis of a value for the motion of the electric motor, the disengaging mechanism and/or axially movable parts of the friction clutch assigned to the latter. For example, the rotary motion of the electric motor may be determined using one or more Hall sensors, which may also be used to control an electric motor that may be commutated electronically. Furthermore, distance sensors may be situated on the disengaging system and/or on the lever system of the friction clutch itself, or on other axially moving components that indicate the state of disengagement of the friction clutch and place it in relationship with control signals. In this way the functional capability of the electric motor in question may be registered, and may for example be compared with specified values of a functioning unit.

Furthermore, electrical variables such as current, voltage, resistance, power or variables derivable from these can be determined, from which it is possible to draw conclusions about the functional capability of the electric motor.

If it is found that the functional capability is reduced or entirely lacking, for example by exceeding a limiting value for the functional capability of the electric motor, a signal may be produced in the control device—an interrupt signal, for example—which, in a program sequence for selecting and shifting the gears, causes all of the gears in the sub-drivetrain affected by the failure or malfunction of the electric motor to be disengaged. The dual clutch transmission is then operated in an emergency driving mode, in which the gears remaining in the other sub-drivetrain are shifted and a change of gears occurs with an interruption of the tractive force, by disengaging the friction clutch that is still functional, disengaging the active gear, moving the next gear that is to be engaged to the same transmission input shaft and re-engaging the friction clutch.

In addition, the problem with the drivetrain and its operation may be reported to the driver, and/or a corresponding warning and/or action measures may be output visually or audibly. In addition, an entry may be made in an error memory of the control device. If the functional capability is found after passing a review to be restored following only a brief malfunction of the electric motor at high or low temperatures or after long operation or the like, the sub-drivetrain can be returned to operation, while appropriate warnings and instructions to the driver and corresponding error entries are confirmed or appropriately modified.

BRIEF DESCRIPTION OF THE SEVERAL VIEWS OF THE DRAWING

The invention will be explained in greater detail on the basis of FIGS. 1 through 3. The figures show the following.

DETAILED DESCRIPTION OF THE INVENTION

Figure 1:
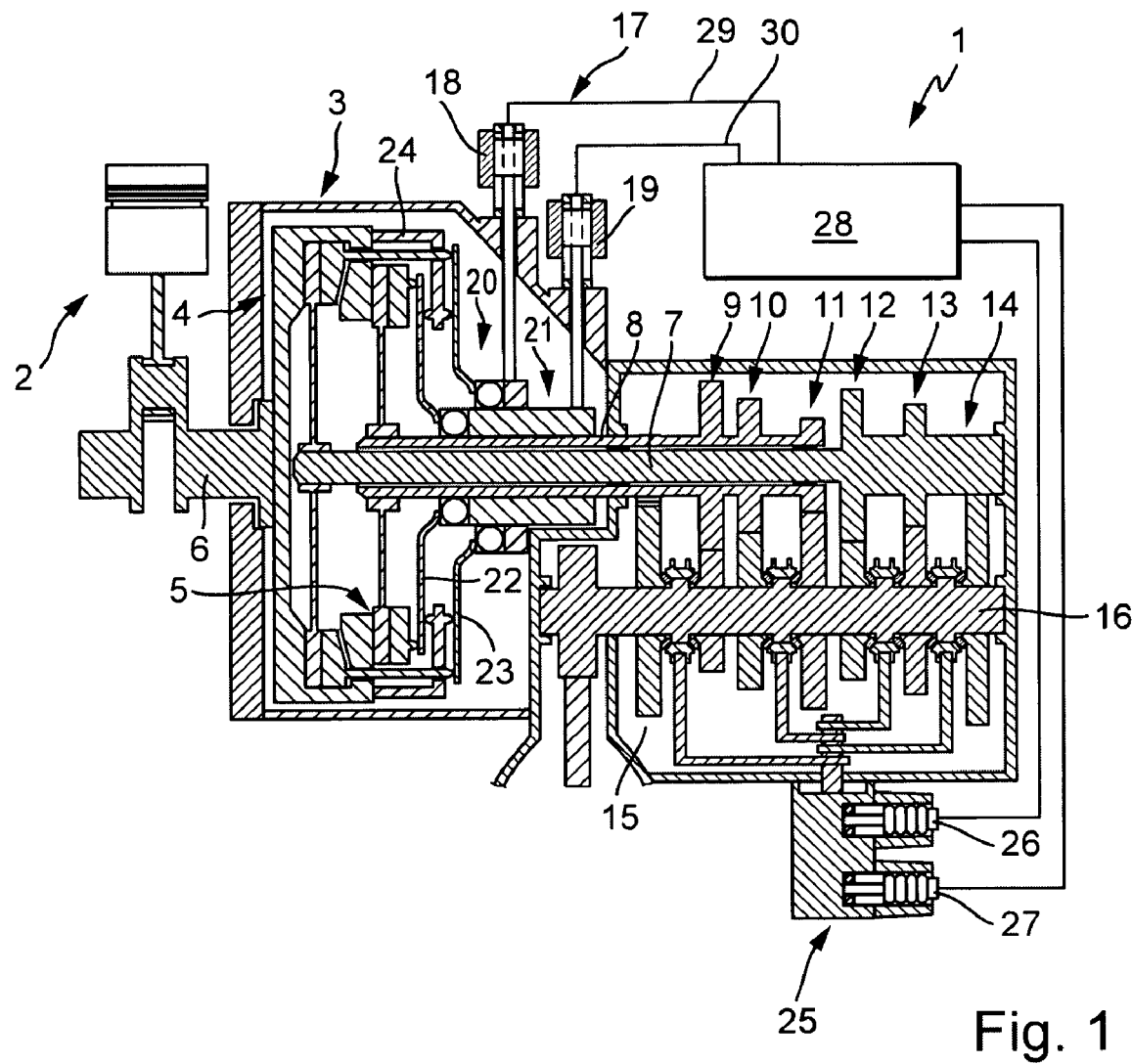
FIG. 1 a schematic depiction of a dual clutch transmission.

FIG. 1 shows a schematic depiction of an exemplary embodiment of a dual clutch transmission with a dual clutch 3 driven by a combustion engine 2, having two individual friction clutches 4, 5, which are connected on the input side to the crankshaft 6 of combustion engine 2 and on the output side to the transmission input shafts assigned to them, namely transmission input shaft 7 and transmission input shaft 8, which is situated around transmission input shaft 7 as a hollow shaft. Transmission input shafts 7, 8 mesh with output shaft 16 by means of the end-face-serrated gear trains 9, 10, 11, 12, 13, 14, 15 which form the individual gears.

The two friction clutches 4, 5 are operated by the clutch disengaging system 17, with one electric motor 18, 19 in each case acting on the respective lever systems 22, 23 of friction clutches 4, 5, which bear against clutch housing 24 by means of an indicated disengaging mechanism 20, 21. The gears are shifted by means of the transmission actuator 25, whose principle of operation is indicated only schematically; it has one electric motor 26 for selecting and one electric motor 27 for shifting the dual clutch transmission 1. The shifting mechanism can be designed according to a so-called active interlock system, which is revealed for example in DE 102 06 561 A1 which is hereby incorporated by reference in its entirety. In other versions the dual clutch transmission can be operated hydraulically or by means of some other actuating system. Furthermore, other transmission forms of a dual clutch transmission are not limiting for the inventive idea.

The electric motors 18, 19 of clutch disengaging system 17 and—if present—the electric motors 26, 27 of transmission actuator 25 are addressed and supplied with electric energy by control device 28. If one of the electric motors 18, 19 fails, or if one of the lines 29, 30 to control device 28 is interrupted, while the friction clutch 4, 5 assigned to the corresponding electric motor 18, 19 is transmitting torque, if torque is also being transmitted via the other friction clutch 5, 4, a lock-up of dual clutch transmission 1 can occur, since the torque transmitted from the transmission input shafts 7, 8 to the transmission output shaft 16 may differ due to the difference in transmission ratios of the gears engaged with the transmission input shafts 7, 8 and depending on the positions of the two friction clutches 4, 5. While in the case of a self-opening disengaging mechanism the friction clutch blocked by the malfunctioning electric motor opens by itself with additional effort by means of a pre-tensioned spring, in the case where a more simply engaged disengaging mechanism is used the friction clutch 4 or 5 in question does not disengage. According to the invention, a routine is therefore triggered in the control device in which the transmission actuator 25 is addressed as soon as a malfunctioning of an electric motor 18, 19 is detected, and the gear currently situated on the transmission input shaft 7, 8 assigned to the friction clutch 4, 5 in question is immediately disengaged. For example, if the electric motor 18 that actuates friction clutch 4 exhibits a malfunction during an overlapping shifting of friction clutches 4, 5 and when gears are engaged with gear trains 10, 13 activated, transmission actuator 25 is addressed in the control device 28 so that the gear with the gear train 13 on the transmission input shaft 7 assigned to friction clutch 4 is disengaged. Other gear trains are not selected at this stage, so that while friction clutch 4 does transmit a torque to transmission input shaft 7 it cannot transmit it from there to transmission output shaft 16. Until the malfunction is corrected, the dual clutch transmission can be operated with the gear trains 9, 10, 11, 15 as a transmission with traction interruption, corresponding to an automated shifting transmission with two shafts. If a malfunction occurs in electric motor 19, the sub-drivetrain with friction clutch 4 and transmission input shaft 7 is operated, while friction clutch 5 and transmission shaft 8 with gear trains 12, 13, 14 are shut down.

Figure 2:
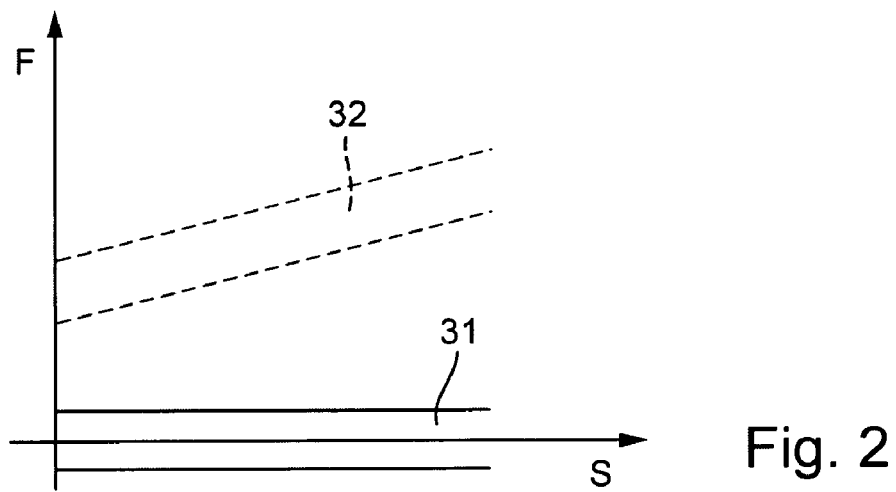
FIG. 2 a diagram illustrating reserve forces on the clutch disengaging system; and, FIG. 3 a flow chart of an exemplary embodiment of a program routine for carrying out the method.

FIG. 2 shows a diagram of the force F over the actuation path S for a self-opening and a non-self-opening disengaging mechanism for a pressure-engaged friction clutch in corresponding tolerance ranges. The tolerance band 32 of the force F for a self-opening disengaging mechanism over the path is visible between the dashed lines. In order to open a friction clutch operated by this disengaging mechanism when there is a malfunction of the electric motor, it is pre-tensioned against the effect of one or more energy storage devices at each disengaging procedure. The disengaging unit must be of stronger mechanical design overall. The energy for engaging the friction clutch increases at each engagement of the friction clutch, due to pre-tensioning of the energy storage device.

Use of the proposed system for disengaging the active gear when a malfunction occurs makes it possible to use a non-self-opening disengaging mechanism whose tolerance band 31 of force F over path S is situated around the zero point due to the lack of energy storage devices, so that the disengaging mechanism is easier to operate, so that the disengaging mechanism and the electric motor can be designed with correspondingly smaller dimensions.

Figure 3:
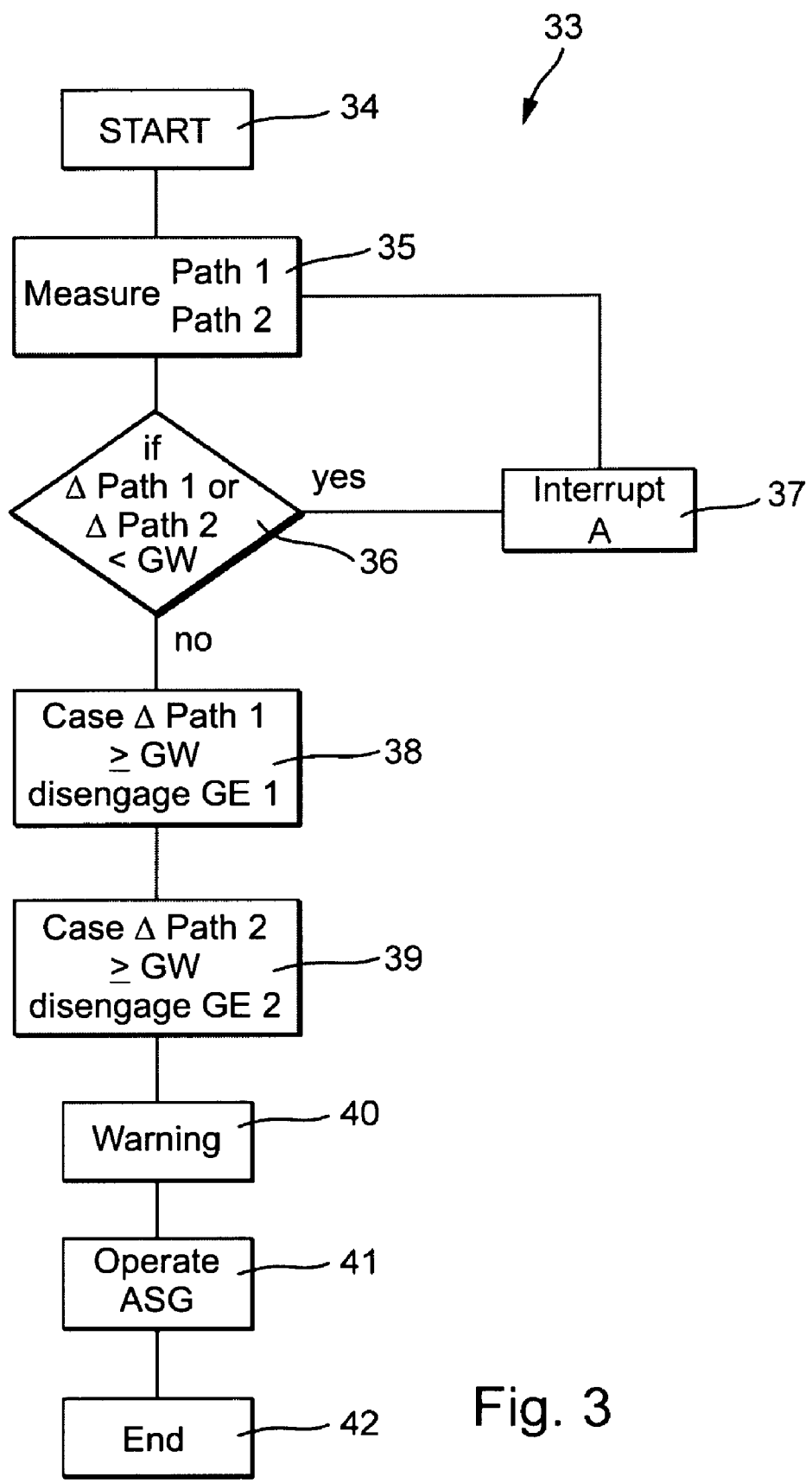

FIG. 3 shows an exemplary embodiment of a flow chart for a routine 33 for carrying out the method according to the invention. Routine 33 is started in block 34. In block 35 measurements are recorded and values calculated which can be checked to assess the functional capability of the two electric motors of the clutch disengaging system. For example, the paths PATH1, PATH2 of the two friction clutches are detected. In the branch 36, deviations ΔPATH1, ΔPATH2 of the paths of the two friction clutches from desired paths are determined. If the deviations are smaller than a predefinable limiting value GW, which may be different for the two friction clutches, the process loops back through block 37, which enables termination of routine 33, into block 35, and the measurement is repeated. An interrupt A in block 37 can occur for example when the vehicle is shut down, under driving conditions in which a malfunction is insignificant, for example when driving for a long distance in one gear or the like.

If the limiting value GW is exceeded by an electric motor or by the measurement relating thereto with the deviation ΔPATH1, in block 38 the current gear of the transmission input shaft GE1 affected thereby is disengaged. If the other transmission input shaft GE2 is affected by the electric motor belonging to it by exceeding the limiting value GW, the current gear of this shaft is disengaged in block 39. In block 40 a warning is issued to the driver, for example that an emergency driving mode is being engaged. In addition, a warning may be issued if the reverse gear is no longer activatable because it is situated on the blocked transmission input shaft. In block 41 an emergency driving mode is introduced, which is similar to operation of an automated shift transmission with traction interruption. Routine 33 is ended in block 42.

REFERENCE LABELS 1 dual clutch transmission
2 combustion engine
3 dual clutch
4 friction clutch
5 friction clutch
6 crankshaft
7 transmission input shaft
8 transmission input shaft
9 gear train
10 gear train
11 gear train
12 gear train
13 gear train
14 gear train
15 gear train
16 transmission output shaft
17 clutch disengaging system
18 electric motor
19 electric motor
20 disengaging mechanism
21 disengaging mechanism
22 lever system -continued 23 lever system
24 clutch housing
25 transmission actuator
26 electric motor
27 electric motor
28 control device
29 line
30 line
31 tolerance band
32 tolerance band
33 routine
34 block
35 block
36 branch
37 block
38 block
39 block
40 block
41 block
42 block

What is claimed is:

1. A dual clutch transmission comprising:
two sub-drivetrains, each of said two sub-drivetrains having at least one shiftable gear and a friction clutch operating between each of said two sub-drivetrain and a combustion engine, a clutch disengaging system that actuates the two friction clutches, wherein an electric motor acts on each said friction clutch through a clutch disengaging mechanism; and,
at least one control device to control the two friction clutches and shift said at least one shiftable gear of each of the two sub-drivetrains, wherein a routine is provided in the at least one control device to check the functional capability of the electric motors, wherein if there is a deviation (ΔPATH1, ΔPATH2) of the functional capability of said at least one electric motor from predefined values, all of the at least one shiftable gears of the sub-drivetrain whose assigned friction clutch is operated by the at least one electric motor are disengaged while the assigned friction clutch remains engaged.

2. The dual clutch transmission according to claim 1, wherein at least one of the friction clutches is a friction clutch that is pressed closed by force.

3. The dual clutch transmission according to claim 1, wherein at least one disengaging mechanism is not self-opening.

4. The dual clutch transmission according to claim 1, wherein the at least one control device is made up of a clutch control device and a transmission control device, wherein said clutch control device and said transmission control device have signal connections with each other.

5. The dual clutch transmission according to claim 1, wherein the at least one control device is supplied redundantly with electrical energy.

6. A method for controlling a dual clutch transmission with two sub-drivetrains, each of said two sub-drivetrains having at least one shiftable gear, a friction clutch operating between each of said two sub-drivetrains and a combustion engine, a clutch disengaging system that actuates the two friction clutches, an electric motor acting on each friction clutch through a disengaging mechanism, and at least one control device to control the two friction clutches and shift the gears of the two sub-drivetrains comprising:
checking said electric motors for deviation (ΔPATH 1, ΔPATH 2) of functional capability from predefined limiting values (GW); and, disengaging all of the gears of any one of said two sub-drivetrains when the functional capability of said any one of said two sub-drivetrains deviates from said predefined limiting values (GW) while the clutch of the sub-drivetrain whose functional capability deviates from the predefined limiting values (GW) assigned friction clutch remains engaged.

7. The method according to claim 6, wherein the functional capability of the electric motors of the clutch disengaging system can be assessed on the basis of a value for the motion of the electric motor, the disengaging mechanism and/or axially movable parts of the friction clutch assigned to the latter.

8. The method according to claim 6, characterized in that the functional capability is assessed on the basis of electrical values for the electric motor.

9. The method according to claim 6, wherein when the prescribed limiting values (GWs) are exceeded a signal is generated that causes a disengagement of all gears in a program sequence for selecting and shifting the gears.

10. The method according to claim 6, wherein when the prescribed limiting values are exceeded there is a warning to the driver and/or an entry is made in an error memory of the at least one control device.

* * * * *